Patented July 22, 1924.

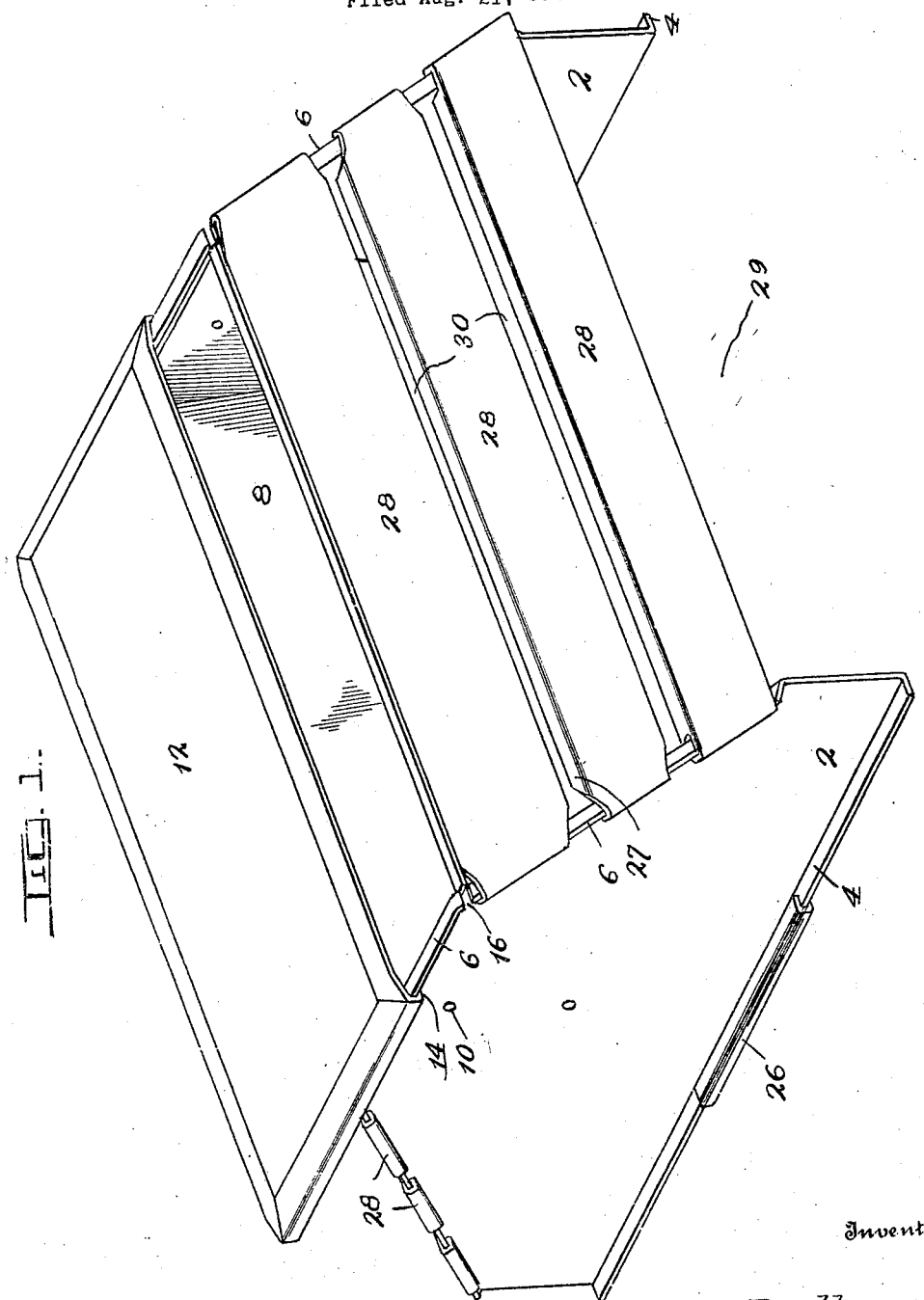

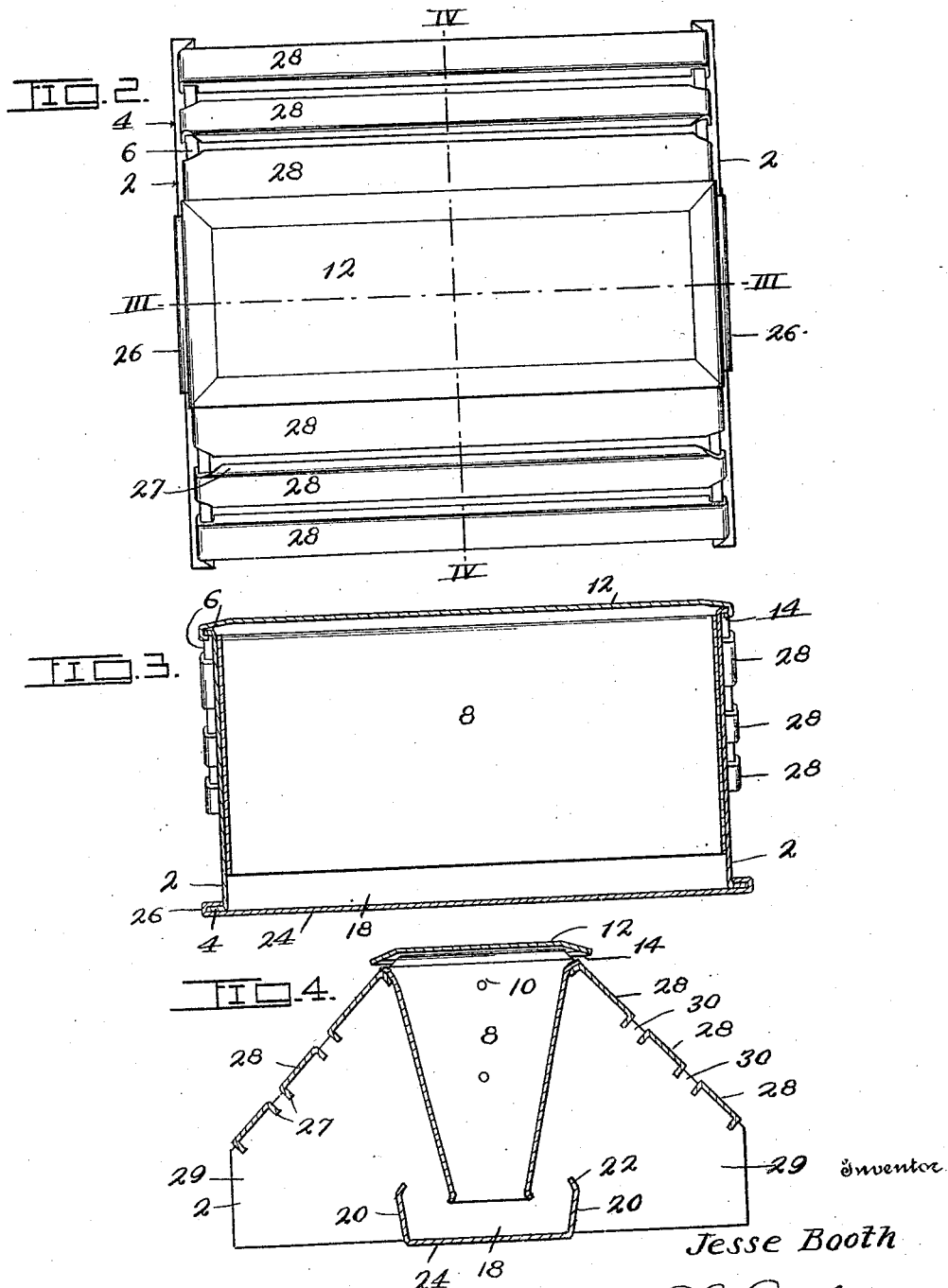

1,502,171

UNITED STATES PATENT OFFICE.

JESSE BOOTH, OF BLYTHEDALE, MISSOURI.

POULTRY FEEDER.

Application filed August 21, 1922. Serial No. 583,116.

*To all whom it may concern:*

Be it known that I, JESSE BOOTH, a citizen of the United States, residing at Blythedale, in the county of Harrison and State of Missouri, have invented certain new and useful Improvements in Poultry Feeders, of which the following is a specification.

My invention relates to self-feeders for baby chicks and other young fowls, and one object is to provide a feeder of this character wherein special and other feeds will be freely accessible to the young fowls but inaccessible to grown fowls.

In carrying out the invention, I provide a hopper from which the feed is fed by the force of gravity to an underlying trough protected by guards which allow the young fowls to pass freely to said trough but exclude the large fowls.

Provision is also made for protecting the feed from rain so that there will be no waste from this cause, such protection being arranged to admit light to the trough so that the young fowls can readily find the feed in the trough.

Other features will hereinafter appear, and in order that the invention may be fully understood, reference will now be had to the accompanying drawings, in which:

Fig. 1 is a perspective view of the feeder with the lid in partly open position.

Fig. 2 is a plan view.

Fig. 3 is a central longitudinal section on line III—III of Fig. 2.

Fig. 4 is a cross section on line IV—IV of Fig. 2.

In carrying out the invention, I employ a pair of end plates 2 having outturned lower and upper flanges 4 and 6, respectively. The upper central portion of the flanges 6 are horizontal for the width of a hopper 8, and then slope downwardly in opposite directions as disclosed by Figs. 1 and 2.

The hopper 8 extends longitudinally of the self-feeder and is open at its top and bottom and secured at its ends to the end plates 2 by suitable means such as rivets 10, thus firmly holding said end plates 2 in place. Feed placed in the hopper 8 is protected from rain and poultry by a lid 12 extending longitudinally over said hopper 8 and provided at its ends with inturned marginal flanges 14 slidably engaging the undersides of the flanges 6, which are slotted at 16 to permit the lid 12 to be opened without striking the inclined portions of said flanges 6.

The reduced lower portion of the hopper 8 discharges into an underlying feed trough 18 fixed at its opposite ends to the end plates 2. The longitudinal sides 20 of the feed trough 18 extend above the discharge opening of the hopper 8, so that when the feed flows from the latter by force of gravity it will not overflow from said trough 18, the upper margins of which are turned in as indicated at 22. The trough 18 may be secured to the end plates by any suitable means, in the present instance I have shown its bottom portion 24 provided with end extensions 26, which are crimped over the bottom flanges 4 of the end plates 2.

The rain and grown fowls are excluded from the trough 18 by guards 28 reinforced by flanges 27 and extending longitudinally of the feeder. The ends of said guards 28 have their ends crimped over the oppositely-disposed inclined portions of the flanges 6, as shown best by Fig. 1. Each upper guard 28 is wider than the two lower companion guards to prevent rain from beating in upon the trough, and said guards 28 are spaced apart as indicated at 30 to admit light, so that the young poultry may readily find the feed in the trough 18. The two lowermost guards 28 come so close to the bottom of the end plates 2 as to exclude grown fowls from the trough 18, but leave entrances 29 for the young fowls.

In order to fill the hopper 8 with feed the lid 12 is either removed or slid open part way, as shown by Fig. 1, so that the feed can be readily placed within said hopper 8. The feed flows down into the trough 18 until the same is filled on a line approximately with the level of the bottom of the hopper 8 and effectually checks further downward movement of the feed until a portion is removed from the trough 18, thus making the device self-acting as long as any feed remains within the hopper 8. The device also protects the young fowls from molestation by the older fowls while feeding.

The feeder is substantially built, preferably, of galvanized sheet metal so that it will stand rough usage and not be affected by rain.

From the foregoing description it is apparent that I have provided a feeder embodying the advantages above pointed out, and while I have shown and described the preferred construction, combination and arrangement of parts, I reserve the right to make such changes as properly fall within the spirit and scope of the claims.

Having thus described my invention, what I claim and desire to secure by Letters Patent, is:

1. A self-feeder consisting of two end plates having sloping sides and upper and lower flanges, a lid slidable on said flanges, a hopper arranged beneath said lid and fixed to the end plates, a trough beneath said hopper and provided with end flanges engaging over the lower flanges on the end plates, and spaced guards secured to the sloping sides of the end plates.

2. A self-feeder consisting of two end plates having sloping sides and provided with upper and lower marginal flanges the former of which have sloping and horizontal portions, a lid extending longitudinally of the self-feeder and having end flanges slidably engaging the horizontal portions of said upper marginal flanges on the end plates, a hopper extending longitudinally beneath said lid and fixed to the end plates, a trough extending longitudinally beneath said hopper and provided with end flanges engaging the lower marginal flanges on the end plates, and spaced guards extending longitudinally above said trough and provided with end flanges engaging the sloping portions of the upper flanges on the end plates.

In testimony whereof I affix my signature, in the presence of two witnesses.

JESSE BOOTH.

Witnesses:
  B. E. COLLINS,
  DORREL GIRDNER.